Dec. 23, 1947.   R. M. NORTON ET AL   2,433,320
MULTIFLOAT MECHANISM FOR CONTROLLING OPERATION OF COAL WASHING JIGS
Filed Nov. 29, 1944   10 Sheets-Sheet 1

Inventors
R.M. NORTON
By G.B. NORTON
Emery Holcombe & Blair
Attorneys

FIG. 2.

Dec. 23, 1947.    R. M. NORTON ET AL    2,433,320
MULTIFLOAT MECHANISM FOR CONTROLLING OPERATION OF COAL WASHING JIGS
Filed Nov. 29, 1944    10 Sheets-Sheet 3

Inventors
R.M. NORTON
By G.B. NORTON
Attorneys

Inventors
R. M. Norton.
By G. B. Norton.
Attorneys

Dec. 23, 1947.   R. M. NORTON ET AL   2,433,320
MULTIFLOAT MECHANISM FOR CONTROLLING OPERATION OF COAL WASHING JIGS
Filed Nov. 29, 1944   10 Sheets-Sheet 5

FIG. 8.

Inventors
R.M. Norton
G.B. Norton
By Erwin Holcombe
Attorneys

Dec. 23, 1947.  R. M. NORTON ET AL  2,433,320
MULTIFLOAT MECHANISM FOR CONTROLLING OPERATION OF COAL WASHING JIGS
Filed Nov. 29, 1944  10 Sheets-Sheet 7

Inventors
R. M. Norton
By G. B. Norton
Emery Holcombe & Blair
Attorneys Dec. 23, 1947. R. M. NORTON ET AL 2,433,320
MULTIFLOAT MECHANISM FOR CONTROLLING OPERATION OF COAL WASHING JIGS
Filed Nov. 29, 1944 10 Sheets-Sheet 8

UNITED STATES PATENT OFFICE 2,433,320

MULTIFLOAT MECHANISM FOR CONTROLLING OPERATION OF COAL WASHING JIGS

Ronald Mervyn Norton and George Bertram Norton, Tividale, Tipton, England

Application November 29, 1944, Serial No. 565,688
In Great Britain December 23, 1943

15 Claims. (Cl. 209—496)

The mechanical separation of a raw coal according to its density into a saleable fuel and a reject is possible because there is in almost every seam of coal a substantially constant relationship between the ash content and the specific gravity of the particles comprising the raw coal, the lightest particles having the lowest ash content and the heaviest particles the highest ash content. There is, of course, no clear line of division between pure coal on the one hand and shale on the other hand. The raw coal contains particles varying in purity over the whole range between the cleanest coal and the least combustible refuse, particles which, therefore, also vary in specific gravity between the lightest, which is usually less than 1.30 specific gravity, and the heaviest, which is usually greater than 1.80 specific gravity.

The commercial requirement governing the separation of a raw coal into saleable fuel and reject is usually that the ash content of the saleable fuel shall not exceed a given value, and the normal way of obtaining such a fuel is to control the operation of a washing jig so that the separation shall take place continuously, so far as is possible within practical limits, at a constant predetermined specific gravity. In most modern washing jigs, the discharge of the refuse is automatically controlled through suitable relay mechanism by a float whose level varies, or tends to vary, in accordance with the variations in the quantity or refuse contained in the raw coal which is fed to the washer. By means of such a float and relay mechanism it is possible to ensure within reasonable practical limits that the separation of the lighter and purer material from the heavier material of high ash content does take place at a constant specific gravity.

In practice this separation is usually made somewhere in the range of what are commonly known as "middlings," that is to say, somewhere between 1.40 and 1.80 specific gravity, with the result that the saleable fuel consists of a mixture of substantially pure coal (lighter than say 1.4 specific gravity) with an ash content appreciably less than the maximum permitted by commercial requirements, and some of the middlings heavier than 1.4 specific gravity, which may in themselves have an ash content appreciably higher than the maximum permitted by commercial requirements. It will be appreciated therefore that the actual ash content of the saleable fuel is dependent not only on the respective ash contents of the substantially pure coal and the included middlings, which usually remain reasonably constant, but also on the ratio of the quantities of these two materials in the cleaner of the two fractions into which the raw coal is separated in the washing jig. Since the ratio of the pure coal to the middlings in the raw coal frequently varies, the specific gravity at which separation is made must be such that the ash content of the cleaner fraction, i. e. the saleable fuel, does not exceed the predetermined value when the proportion of middlings to pure coal is the greatest. It follows, therefore, that whenever this proportion decreases, the ash content will also decrease.

The variations in ash content which, for the reasons given above, usually result from a constant specific gravity separation may not always be objectionable to the consumer; they are, however, inevitably disadvantageous to the producer, since it is clear that whenever a washing jig delivers saleable fuel with an ash content below the permitted maximum, the quantity of fuel recovered is less than was potentially obtainable, since some of the rejected higher ash material could have been included with the saleable fuel.

Figure 1:
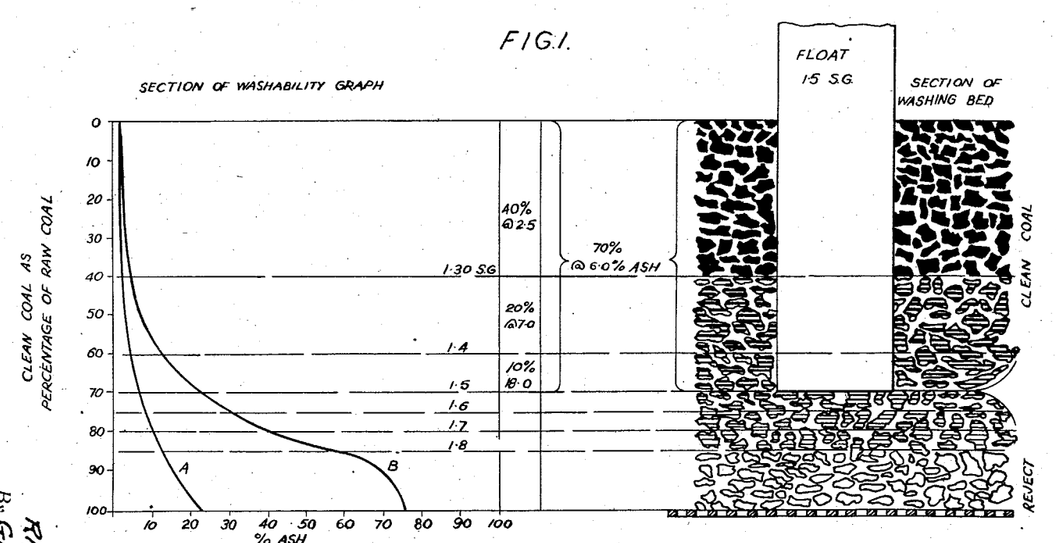
Figure 1 is a diagrammatic illustration of a vertical section through a stream of material undergoing treatment in a washing jig, indicating the concentration of different constituents, and including a graph showing the variation in ash content with the percentage of raw coal delivered as clean coal.

This may be better understood by reference to Figure 1 of the accompanying drawings. The left-hand part of this is a graph relating to a typical seam of coal and showing the variation of the ash content with the percentage of the raw coal which is delivered as clean coal after washing. The curve marked A shows the total ash content of the clean coal which varies from 2½ to 22½ approximately, depending upon where the separation is made, and the curve marked B shows the maximum ash content of the several strata contained in the clean coal. The graph also shows the specific gravities corresponding to the clean coal yield and the percentages of ash therein. It will be seen that if the maximum permitted ash content is 6%, 70% of the raw coal can be recovered as clean coal and 30% must be discharged as the refuse fraction.

Now in this example the average ash content of the fraction lighter than 1.30 specific gravity is 2.5%, that of the fraction between 1.3 and 1.4 specific gravity 7% and that of the fraction between 1.4 and 1.5 specific gravity 18%, and these last two fractions constitute a substantial proportion (30%) of the raw coal. The curves show the average figures obtained from samples selected over a long period. Throughout this period variations in the relative proportions of the fractions occur. As an example, the fraction having a specific gravity between 1.3 and 1.4 may decrease with a corresponding increase in the fraction having a specific gravity between 1.4 and 1.5, with the result that if the separation is being effected at 1.5 specific gravity the ash content of the clean coal will increase, since it contains more material having an ash content in the order of 18% and less having an ash content in the order of 7%. Assuming that the separation is being controlled by a float as indicated in the right-hand part of the figure, the float could be set to effect the separation at 1.5 specific gravity as shown but for the temporary variations just described. To take account of these it is necessary to set the float to effect the separation at a lesser specific gravity, so that during much of the operation the fraction of the raw coal delivered as clean coal is smaller than it need be.

It should be remarked that Figure 1 is purely diagrammatic. In the first place, a float of the kind in question is often weighted to a specific gravity other than that at which it actually effects the separation, corresponding adjustment being made in the connection between it and the mechanism for controlling the refuse discharge. In the second place, although the right-hand part of the figure shows the bed of material as exactly corresponding to the specific gravities of the left-hand part, in practice the clean coal fraction may travel horizontally through the jig more quickly than the refuse and constitute a correspondingly smaller proportion of the depth of the bed.

Our object is to reduce the loss of saleable fuel resulting from the variations described above, and for this purpose we effect the separation at a specific gravity which varies with the relative depths of two or more strata contained in the cleaner fraction, so that as the depth of a light stratum in this fraction increases relatively to that of a heavy stratum, the specific gravity of the separation increases also; in consequence more heavier material, i. e. more of the middlings, is included in the cleaner fraction to make up for the reduction in ash content that would otherwise be brought about and the ash content in the cleaned coal is maintained more nearly constant. Similarly, when there is a decrease in the depth of a light stratum relatively to that of a heavy stratum, so that the ash content of the cleaner fraction tends to rise, the specific gravity of separation is decreased and in consequence fewer middlings are included in the cleaner fraction and an increase in the ash content over that desired is prevented.

In some existing jigs the raw material is separated into more than two fractions, the middlings and the shale being separated from one another after the clean fraction (the saleable fuel) has been removed. It is to be understood that the references in this specification to the cleaner fraction and the reject or refuse refer respectively to the saleable fuel and the remainder of the raw coal and that it is immaterial whether the reject or refuse is further separated or not. It is also to be understood that it is variation in the relative depths of strata in the cleaner fraction that is the important factor and that variations in the relative depths of any strata in the reject or refuse are not a matter of importance.

We aim also at providing an improved float-controlled jig which will yield more saleable fuel than existing jigs. However it is to be understood that if a jig constructed in accordance with this invention is effective for the purpose intended and economically advantageous, it is not essential that it be designed to eliminate the whole of the losses resulting from the changes in ash content which occur when making a separation at a constant specific gravity; it is only necessary appreciably to reduce the variations in ash content and the consequent losses of potentially saleable fuel in order to constitute an important advance in the art.

The number of strata in the cleaner fraction that are taken into account depends upon the nature of the coal. In a coal containing very few middlings we prefer to use a relatively simple apparatus designed materially to reduce the above-mentioned losses, but in a coal containing a large proportion of middlings, such as the coal to which Figure 1 relates, we prefer to use an apparatus that is mechanically rather more elaborate in order to take account of variations in the relative depths of the strata above 1.3 specific gravity, between 1.3 and 1.4 and between 1.4 and 1.5 respectively. These figures are given solely by way of example, and in another coal it may be found for example that the specific gravity at which the jig may be set to effect the separation may be 1.65 and that the bed contains relatively thick strata of, for example, from 1.50 to 1.55 specific gravity, from 1.55 to 1.60 specific gravity and from 1.60 to 1.65 specific gravity, so that variations in the relative depths of these strata should be taken into account.

Thus in carrying out the invention we may make use of any desired number of floats, each adjusted to a different specific gravity and each responsive to any change (as shown by variation in the position taken up by the float in the stratified bed of material) in the corresponding stratum of the raw coal. At least one of these floats always works in that part of the bed which is discharged as the clean fraction, and all of them are operative to vary the rate of discharge of the reject directly or indirectly, and in so doing to effect the separation at such a specific gravity as to reduce the variations in the ash content of the clean fraction that would occur if only one float were used.

In the preferred apparatus the operation of the means for controlling the discharge of the reject is in effect governed not only by the position of a primary float but also by the relative positions of it and at least one other float working at a higher level.

The discharge of the reject may most conveniently be controlled by a refuse gate, but any other means for controlling this discharge, e. g. a valve that in turn controls the amplitude of pulsations of the water in a part of the jig traversed only by the reject, may be employed and be governed by the floats.

It is preferred in any case to govern the operation of the discharge gate or other means through a relay mechanism and to connect the floats to movable members of this mechanism.

Some jigs in accordance with the invention will now be described by way of example with reference to Figures 2 to 19 of the accompanying drawings, in which.

Figure 2:
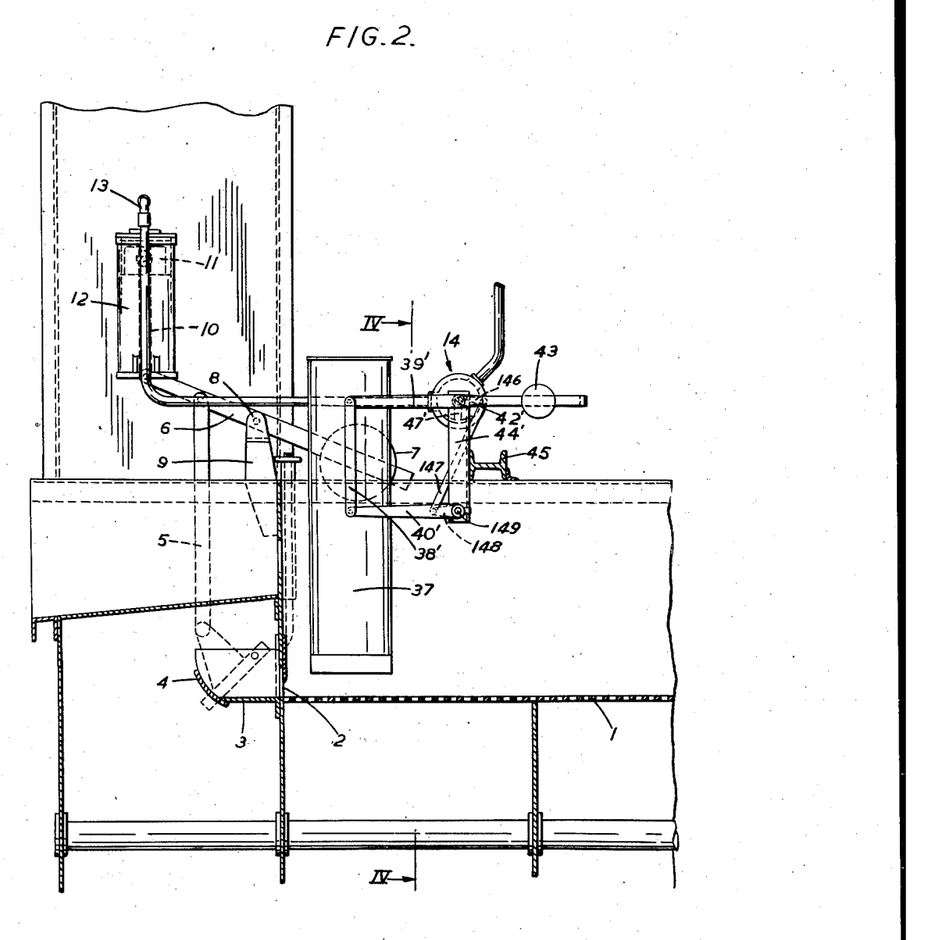
Figure 2 is a longitudinal section through part of one end of a jig equipped with two floats.
Figure 3:
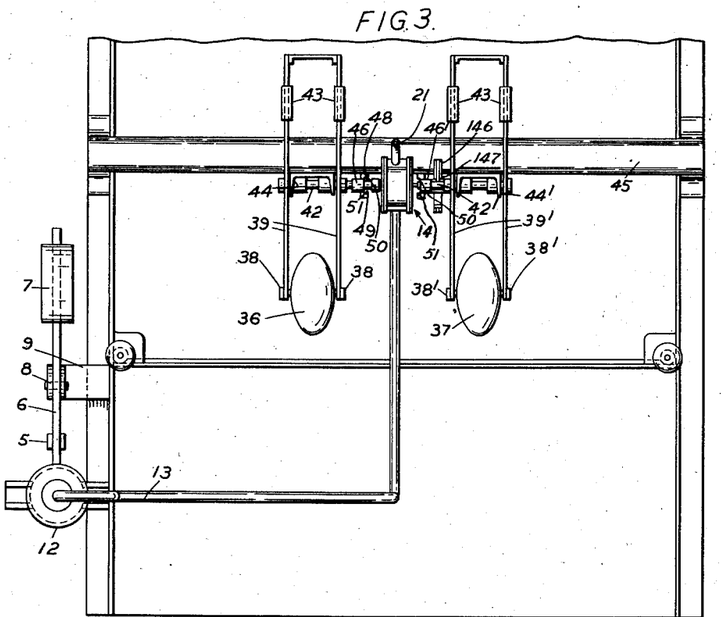
Figure 3 is a plan of the part shown in Figure 2.
Figure 4:
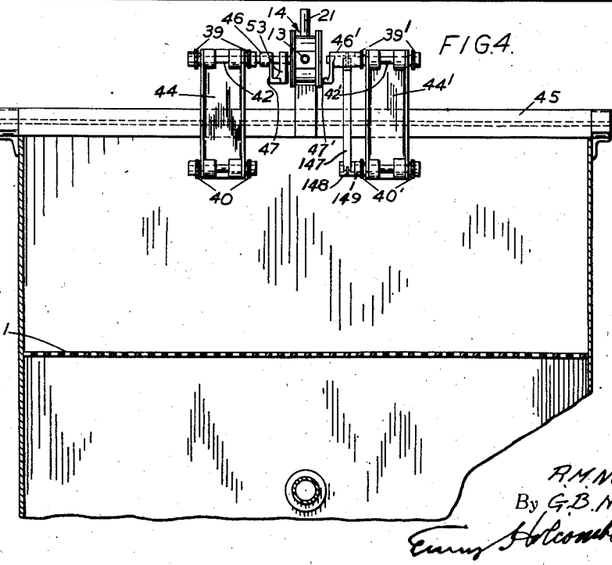
Figure 4 is a section on the line IV—IV in Figure 2.

The jig shown in Figures 2 to 4 is of the kind in which coal is stratified on a perforated plate 1 by water which rises and falls in pulsations, reject material passing out through an outlet opening 2 over a projecting shelf 3, across the free end of which a quadrant gate 4 rocks to control the rate of discharge. This gate is pivotally connected to a rod 5 which in turn is pivoted to a connecting rod 6 having a weight 7 at one end and pivotally mounted at 8 on a fixed bracket 9. At its other end the rod 6 is pivoted to a piston rod 10 connected to a piston 11 moving in a cylinder 12, to which compressed air is supplied through a pipe 13. Thus the gate 4 is pneumatically operated, as when air is forced into the cylinder 12 the rod 6 is rocked counterclockwise about the pivot 8, the rod 5 is forced downwards and the gate 4 is moved in a downwards direction to constitute less of a barrier to reject material flowing over the plate 3. When the air in the cylinder 12 is allowed to escape to atmosphere the reverse movement takes place and the gate 4 rises to retard or stop the outward flow of reject material.

This arrangement of a refuse discharge gate is well known and as a rule the supply of compressed air to the operating cylinder and its escape from the cylinder are controlled by a relay valve which is connected to a float and moves as the float rises and falls. In the jig shown in Figure 2 to 4 there are two floats 36 and 37 and each is connected to a movable part of a relay valve which is indicated generally at 14 in Figures 2 to 4 and shown in detail in Figures 5 to 7.

Figure 5:
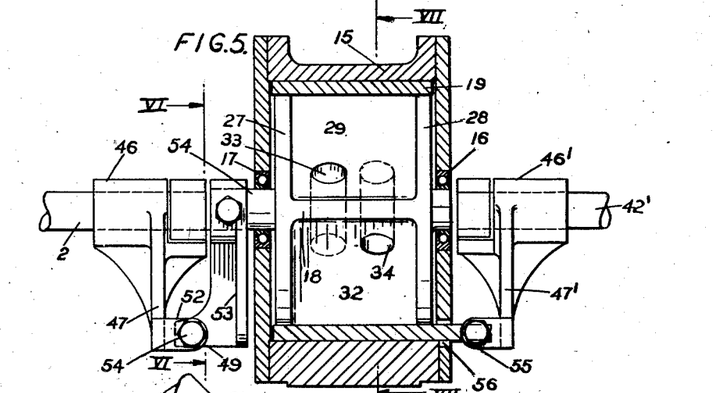
Figure 5 is a section through a relay valve forming part of the apparatus shown in Figures 2 to 4, the section being taken substantially on the line V—V in Figure 7.
Figure 6:
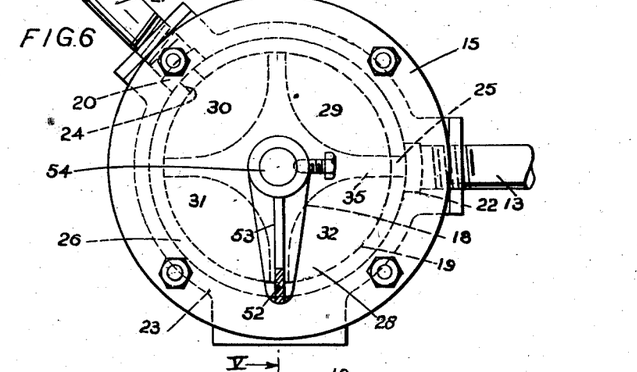
Figure 6 is a section on the line VI—VI in Figure 5.
Figure 7:
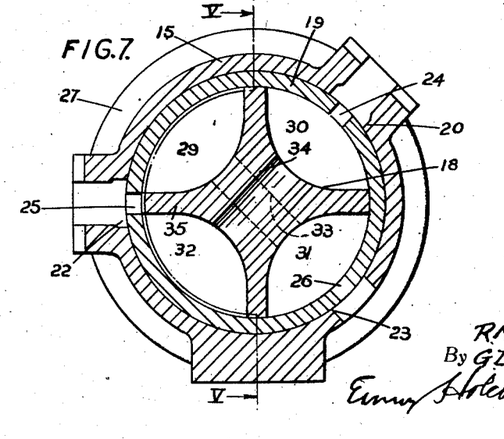
Figure 7 is a section on the line VII—VII in Figure 5.

This valve comprises a fixed cylindrical casing 15 with ends which are closed except for central openings in which bearings 16 and 17 are fixed. A valve member 18 is mounted to rotate in these bearings and it is surrounded within the casing 15 by a ported sleeve 19. The casing 15 has an inlet port 20 connected to a pipe 21 which leads from a supply of compressed air. The casing 15 is formed with two further ports, namely a port 22 to which the pipe 13 is connected and a port 23 which is simply open to the atmosphere and acts as an exhaust port. The ports in the sleeve 19 are formed by three slots 24, 25 and 26 parallel to its axis and in register respectively with the ports 20, 22 and 23, and in operation the sleeve rotates through a few degrees in one direction or the other without bringing these pairs of ports out of register. The flow of the compressed air is controlled by the valve member 18, which has two circular ends 27 and 28 and a body part which unites the ends and, as seen in cross-section, is star-shaped so that there are four recesses or air spaces 29, 30, 31 and 32 within the sleeve 19. The body part of the valve 18 is bored twice diametrically, one bore 33 interconnecting the air spaces 29 and 31, and the other bore 34 being axially offset from the bore 33 and interconnecting the air spaces 30 and 32. One arm 35 of the star-shaped body of the valve co-operates with the slot 25 and closes this in the position shown in the drawings. In consequence, in this position compressed air entering through the pipe 21 passes into the space 30 and through the bore 34 into the space 32, from which it cannot escape. The bore 34 ensures that the air pressures in the spaces 30 and 32 are equal, so that there is no resultant pressure forcing the valve member in a radial direction and thus setting up frictional resistance to rotation.

The valve member 18 is rocked upon movement of the primary float 36 in the apparatus, and the sleeve 19 is rocked by the secondary float 37. The float 36 is carried by the vertical arms 38 of a parallel-motion linkage which also comprises upper horizontal arms 39 and lower horizontal arms 40 pivoted in a vertical bracket 44, and a shaft 42 passes through and is keyed to the arms 39 and 40. The arms 39 are extended rearwardly to carry counterbalance weights 43. The shaft 42 is carried in bearings in the bracket 44, which is fixed to a girder 45 forming part of the jig frame. Thus the whole linkage and the rod 42 rock as the float moves up and down.

A sleeve 46 is keyed to the rod 42 and is integral with a calliper bar 47 having two arms 48 and 49 through which screws 50 and 51 pass so as to present between them a gap which is adjustable in width. A nose 52 formed on a rod 53 projects into this gap. The rod 53 is secured to an extension 54 of the valve member 18, so that the valve member rocks with the rod 53. In operation the float 36 moves up and down with the pulsating water but so long as it only moves about a stationary mean position its movement has no effect upon the valve member 18, since there is lost motion between the calliper arms and the nose 52. If, however, the float rises in consequence of an increase in the depth of the bed of reject material, the calliper bar 47 will rock anti-clockwise as seen in Figure 6 and bring the end of the screw 50 into engagement with the nose 52, thus rocking the valve member 18 similarly. Downward movement of the float will bring about reverse movement of the valve member by engagement of the screw 51 with the nose 52.

Figure 14:
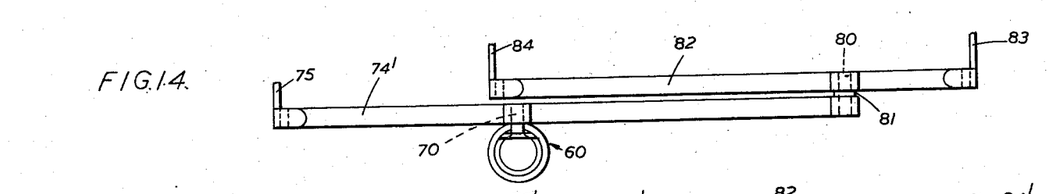
Figures 14, 15 and 16 are diagrams illustrating mechanisms operated by either three or four floats.

The float 37 is mounted in a similar way on a parallel-motion linkage 38', 39' and 40', a bracket 44' and a rod 42', on which a sleeve 46' and calliper bar 47' are loosely mounted. The arms of the calliper bar 47' engage one on each side of a lug 55 which is integral with the sleeve 19 and projects through an opening 56 in the end face of the valve 14. Upward and downward movement of the float 37 accordingly leads to rotational movement of the sleeve 46'. The sleeve has a radial arm 146 to which one end of a link 147 is pivoted, the other end of this link being pivoted to a radial arm 148 which is rigid with a rod 149 keyed to the lower end of the arm 40'.

If the primary float rises while the secondary float is stationary the arm 35 is moved anti-clockwise as seen in Figure 6 and so uncovers the port 25 with the result that compressed air from the space 32 can pass to the pipe 13 and thus to the gear for operating the refuse discharge gate. If the primary float falls the arm 35 moves clockwise as seen in Figure 6 and so puts the space 29 into communication with the port 25, with the result that air can flow out of the cylinder 12 into the space 29, through the bore 33 into the space 31, and thence to atmosphere through the ports 26 and 23. If the secondary float 37 rises while the parts are in the position shown in Figure 6 the arms 40' will rock the rod 149 which through the link 147 and arm 146 will turn the sleeve 46', with the result that the sleeve 19 is rocked in a clockwise direction and puts the space 32 in communication with the port 25 so that compressed air can pass to the port 22 and so to the cylinder 12. If the float 37 falls, the sleeve 19 will rock anti-clockwise and so allow air to escape to atmosphere by way of the port 25 and space 29.

Before the jig is put into operation the coal is analysed and the primary float 36 is generally weighted to sink through the stratified bed to the stratum at which separation is to take place, and the secondary float 37 is weighted to sink through what may be regarded as the pure coal stratum and to rest on a lighter stratum in the middlings than the primary float. In practice the total depth of the stratified material remains substantially constant, and, since the position of the primary float 36 varies with the depth of the reject fraction, the difference in level between the two floats is an approximate measure of the ratio of middlings to pure coal in the cleaner fraction.

The effect of admitting air to the pipe 13 is to lower the gate 4. The movement of the secondary float 37 serves to vary the movement of the gate in that as the secondary float rises (indicating a greater ratio of middlings to clean coal) and the difference in level between the two floats increases, the gate will be opened earlier than would be the case if there were no secondary float. In effect this means that the specific gravity at which the separation is taking place is decreased, because more of the bed will be discharged as reject and less as clean coal.

While, for the most effective attainment of the objects of this invention, the primary float 36 should be set at the specific gravity which analysis of the raw coal shows to be that at which separation should normally take place, the objects of the invention may be achieved to a lesser but still useful degree if the float is initially set at an arbitrarily chosen specific gravity, usually in the heavier part of the middlings range, as it is the setting of the valve 14 in relation to the float, and not the absolute position of the float, that determines the setting of the refuse gate; in other words, the changes in the position of the float 36 from any arbitrary initial position serve to move the gate in the desired way. The connection between the secondary float 37 and the valve sleeve 19 is adjusted to keep the sleeve 19 in its normal position so long as the raw coal remains of the expected composition. If this varies, the relative positions of the two floats will also vary, and under such conditions, since the specific gravity of the primary float 36 is not actually altered, the float, even if initially set at a specific gravity corresponding with the desired point of separation, will cease to indicate exactly the level of separation, so that the difference in the levels of the two floats will cease to correspond exactly with the ratio between the two strata in question. However, the apparatus described does serve to correct the tendency to yield too little saleable coal that arises from variations in the composition of the raw coal.

Figure 8:
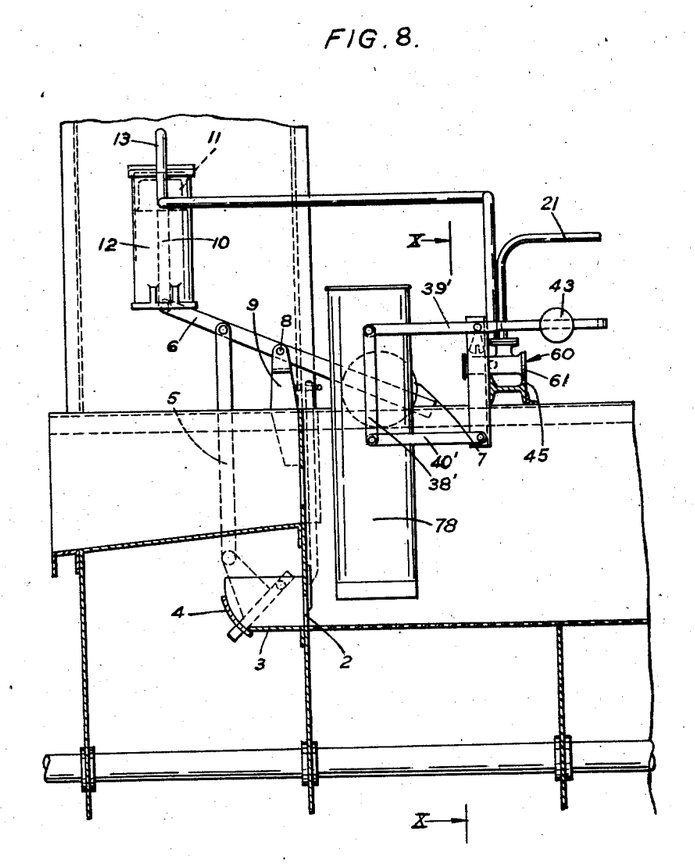
Figures 8, 9 and 10 are views similar to Figures 2 to 4 of part of a jig with a modified arrangement of two floats, Figure 10 being a section on the line X—X in Figure 8.
Figure 9:
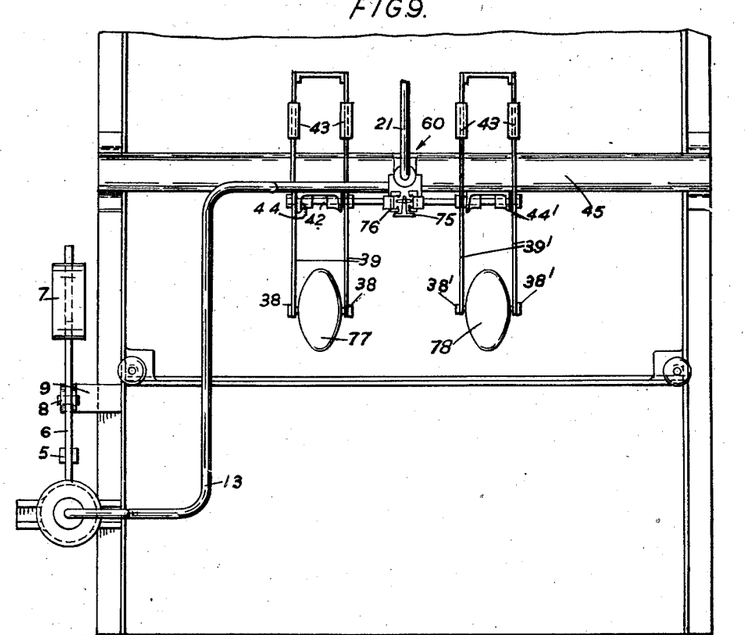
Figure 10:
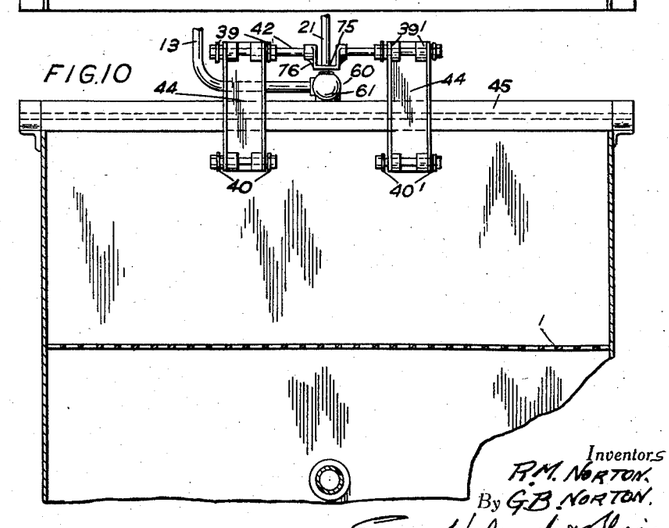

Another way of operating a relay valve or the equivalent is to make each float control one part of a composite mechanism by which the valve or the equivalent is operated. A jig incorporating two floats and a relay valve working in this way is shown in Figures 8 to 10. Except that there are no reversing links, the general arrangement of the jig and the mounting of the floats are the same as that shown in Figures 2 to 4, but the relay valve controlling the flow of air through the pipe 13 is of different construction. This valve is indicated generally at 60 and is shown in detail in Figures 11 to 13.

Figure 12:
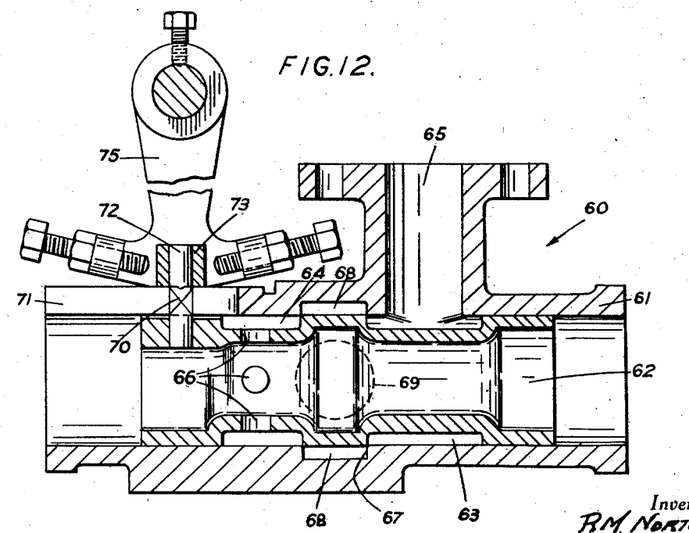
Figures 12 and 13 are sections on the line XII—XII and XIII—XIII respectively in Figure 11.

The valve 60 is a slide valve with an open-ended cylindrical casing 61 and a cylindrical valve member 62 which is hollow and open-ended and reduced in external diameter over two parts of its length so as to leave two annular spaces 63 and 64 between the valve member 62 and the casing 61. Compressed air is admitted by the pipe 21 through a radial inlet passage 65 and passes into the space 63, from which it cannot escape in the position shown in the drawings. The wall of the valve member 62 is formed with ports 66 in the part surrounded by the annular space 64. The valve casing 61 is recessed at 67 to present an annular space 68 which in the position shown is shut off from the spaces 63 and 64 by the central part of the valve member 62. A port 69 in the wall of the casing 61 leads from the space 68 to the pipe 13. Thus if the valve member 62 is moved to the left as seen in Figure 12, compressed air can pass from the space 63 to the space 68 and thence by way of the port 69 and pipe 13 to the gate-operating cylinder 12. If the valve member is moved to the right from the position shown the air in the cylinder 12 can exhaust back through the pipe 13, space 68, space 64 and ports 66 to the atmosphere.

Figure 11:
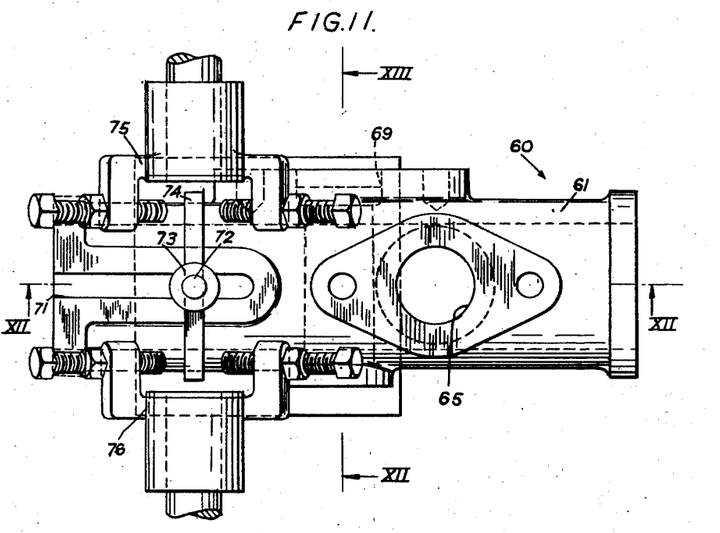
Figure 11 is a plan of a relay valve and associated parts forming part of the apparatus shown in Figures 8 to 10.

The valve member 62 carries a pin 70 having a square shank projecting through a slot 71 in the valve casing 61, so that the valve member can slide in the casing but is prevented from rotating, and this pin terminates in a cylindrical part 72 which enters a cylindrical opening in a boss 73 on a transverse lever 74 and forms a floating pivot for this lever. The ends of the lever 74 lie respectively in the gaps at the ends of calliper bars 75 and 76 operatively connected to primary and secondary floats 77 and 78 respectively in the same way as in the jig shown in Figures 2 to 4. Upward movement of the primary float 77 rocks the calliper bar 75 clockwise as seen in Figures 8 and 12 and so tends to rock the lever 74 anti-clockwise as seen in Figure 11. This brings the opposite end of the lever 74 into engagement with the right-hand arm of the calliper bar 76 and that arm acts as an abutment which (assuming that the secondary float is stationary) is fixed, so the whole lever 74 moves to the left as seen in Figures 11 and 12 and the valve member 62 moves similarly. This allows compressed air to pass to the cylinder 12. Upward movement of the secondary float 78 has the same effect on the valve member, as it tends to rock the lever 74 clockwise and (if the primary float does not move) the right-hand arm of the calliper bar 75 (as seen in Figure 12) becomes a fixed abutment for the end of the lever 74 and again the whole lever moves to the left. In effect, the second float determines the position of an abutment about which the lever rocks as a whole (carrying the pivot and valve member with it) under the action of the first float.

Figure 13:
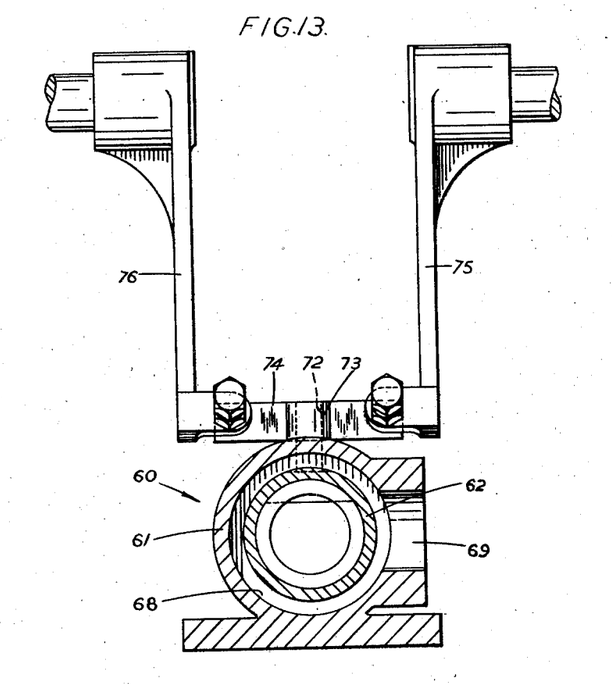
Figure 15:
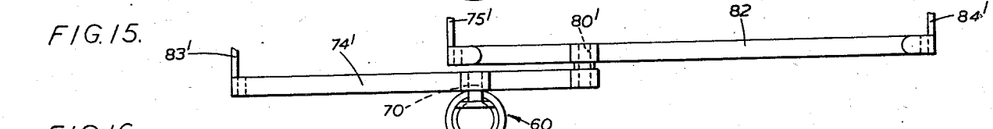

The relay valve 60 shown in Figures 11 to 13 is suitable for use when account is to be taken of the relative depths of more than two strata, so that there are three or more floats. If there are three floats, the second end of the pivoted lever 74, instead of being directly moved through a float, may be pivotally connected to a second lever and the two ends of this may then be rocked by the other floats. This is shown diagrammatically in Figure 14, where one end of such a lever 74' is rocked through a calliper bar 75 by the primary or heaviest float but the other end is connected by a pivot pin 80 surrounded by a washer 81 to a second pivoted lever 82, the ends of which are engaged by calliper bars 83 and 84 respectively moved by the second float and the third and lightest float. An alternative arrangement is shown in Figure 15 in which the calliper bar 83' moved by the second or intermediate float engages one end of the lever 74' and the ends of the second lever 82' are engaged by calliper bars 75' and 84' respectively moved by the primary or heaviest float and the third or lightest float.

Lever systems of this kind present the advantage that the pivots may be placed at any desired point along the length of the levers so that if a pivot point is not at the middle of the lever the effect of a movement of one float will be greater than that of the same movement of the other float acting on the same lever. It will be observed that in Figure 14 the calliper bar 75 of the primary float is closer than the pivot 80 to the pivot 70 in the ratio of 2:3 and that the calliper bar 83 is closer to the pivot 80 than the calliper bar 84 in the ratio of 1:3. Accordingly the heavier the float, the more effect movement of it has on the operation of the valve 60. In Figure 15 the same effect is obtained as the distance between the calliper bar 75' and the pivot 80' is the same as that between the pivot 70 and the pivot 80' but is only one half of that between the pivot 70 and the calliper bar 83' and one third of that between the pivot 80' and the calliper bar 84'.

Figure 16:
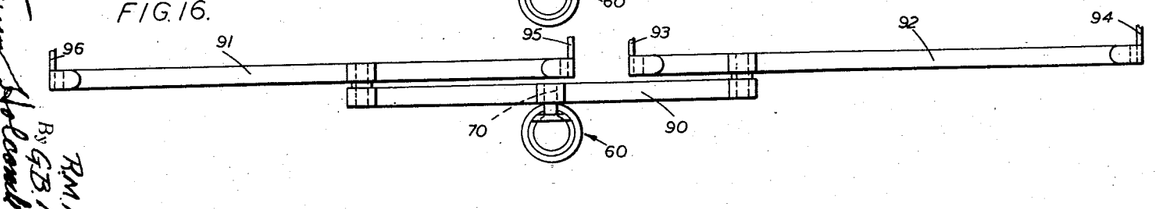

When there are four floats all told, there may be three levers, namely a primary lever directly pivoted to the relay valve and two secondary levers, one pivoted to one end and the other to the other end of the primary lever, and the floats may act on the ends of the secondary levers. This is shown diagrammatically in Figure 16, where a primary lever 90 is mounted on the pivot 70 of the valve 60 and secondary levers 91 and 92 are pivoted to its ends and are each engaged at each end by a calliper bar. In the arrangement shown the lever 90 is pivoted at its centre and the lever 92 at one fifth of its length from one end. The heaviest float is connected to the calliper bar 93 which engages the short arm of the lever 92 and the lightest float is connected to the calliper bar 94 which engages the long arm of the lever 92. The lever 91 is pivoted at a point two fifths of its length from one end and its short arm is engaged by the calliper bar 95 moved by the second heaviest float and its long arm by the calliper bar 96 moved by the lightest float but one.

Figure 17:
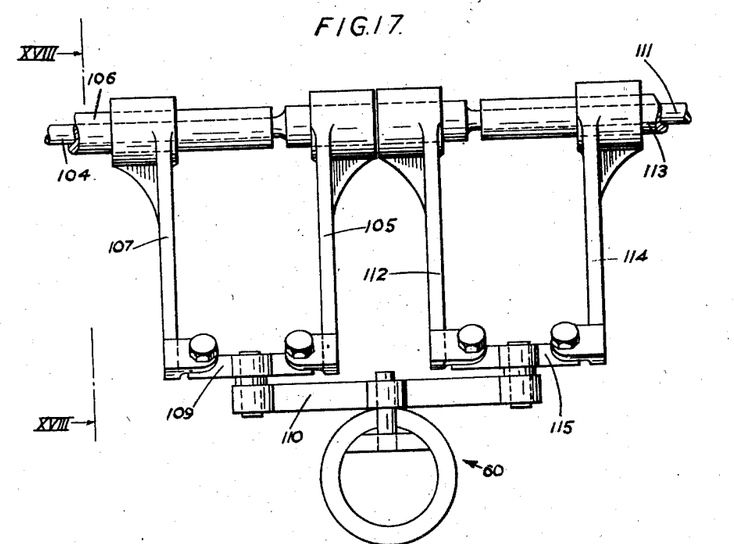
Figure 17 is an elevation of one mechanism operated by four floats.
Figure 18:
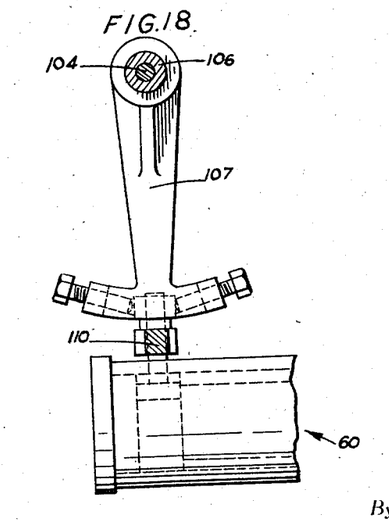
Figure 18 is a section on the line XVIII—XVIII in Figure 17.
Figure 19:
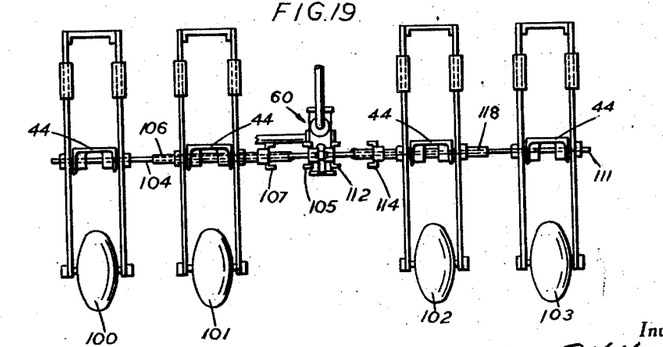
Figure 19 is a plan of this mechanism and the floats and is on a smaller scale.

It is desirable in every case to arrange the floats alongside one another. Figures 17 to 19 show how four floats can be arranged in this way and still operate calliper bars in accordance with the principle illustrated by Figure 16, although the pivoted levers shown in Figures 17 to 19 are all pivoted at their mid-points. In principle on each side of the valve there are two floats one of which is connected to rock a sleeve surrounding a rod rocked by the other. The floats are indicated at 100, 101, 102 and 103 and the float 100 rocks a rod 104 which carries a calliper bar 105. The float 101 rocks a sleeve 106 which carries a calliper bar 107. These two bars engage the opposite ends of a lever 109 pivotally mounted on one end of a lever 110, which in turn is pivotally mounted on the valve member of the valve 60. Similarly the float 103 is connected to a rod 111 which carries a calliper bar 112 and passes through a sleeve 113 which is rocked by the float 102 and carries a calliper bar 114. The calliper bars 112 and 114 engage the opposite ends of a lever 115 which is pivotally mounted on the second end of the lever 110.

We claim:

1. A coal-washing jig for separating raw coal into clean and reject fractions and equipped with multi-float actuated means for controlling the discharge of the reject material comprising a primary float set to a given specific gravity, a secondary float free to move independently of said primary float and set to a lesser specific gravity than the primary float, and means actuated by said floats separately in response to the varying difference in level between the primary and secondary floats for operating said control means so as to increase the specific gravity at which separation is made as the difference in level decreases and vice versa.

2. A jig according to claim 1 including a relay mechanism arranged to govern operation of the discharge-controlling means and having movable members to which the floats are respectively connected.

3. A coal-washing jig for separating raw coal into clean and reject fractions and equipped with a relay governing the operation of means for controlling the discharge of the reject, a primary float set to a given specific gravity, at least one other float free to move independently of said primary float and working at a higher level, and a mechanism interposed between the floats and the relay, each float controlling one part of this mechanism so as to vary the operation of the relay in accordance with the relative position of that float with respect to the other and in so doing to reduce the variations in ash content of the clean fraction which would occur if only the primary float were used.

4. In a washing jig for separating material into two fractions of different average specific gravities and provided with a power-operated device controlling the rate of discharge of the fraction of higher specific gravity; means for maintaining substantially constant the average specific gravity of the lighter fraction comprising actuating means for the power device, plural movable members each arranged to operate the actuating means to increase the rate of discharge when moved in one direction and to decrease it when moved in the opposite direction, a plurality of floats each independent of the other, there being a separate float individually connected to each of the respective movable members for moving it in opposite directions to increase or decrease the rate of discharge respectively as the floats rise and descend, thereby to actuate the discharge-controlling device, said floats being of different specific gravities to work at different levels in material being treated in the jig and the lowermost float being of a specific gravity to work substantially at the level at which separation is to take place.

5. In a washing jig for separating material into two fractions of different average specific gravities and provided with a power-operated device controlling the rate of discharge of the fraction of higher specific gravity; means for maintaining substantially constant the average specific gravity of the lighter fraction according to claim 4 wherein the movable operating members are so arranged relative to each other and to the actuating means that movement by any one of them caused by rise or descent of the float connected to it operates the actuating means to produce increase or decrease in the rate of discharge, and the said members cooperate to produce such a change in rate more rapidly when floats connected to more than one operating member move vertically in the same direction.

6. In a washing jig for separating material into two fractions of different average specific gravities and provided with a power-operated device controlling the rate of discharge of the fraction of higher specific gravity; means for maintaining substantially constant the specific gravity of the lighter fraction according to claim 4 wherein the actuating means is so arranged that the relative positions of the different movable operating members determine the rate of discharge imposed by the power device, whereby such rate is determined by the relative levels of the respective floats.

7. In a washing jig for separating material into two fractions of different average specific gravities and provided with a power-operated device controlling the rate of discharge of the fraction of higher specific gravity; means for maintaining substantially constant the average specific gravity of the lighter fraction in accordance with claim 4 wherein the movable operating members are so arranged relative to the actuator that the amplitude of the movement of any one of them determines the rate of discharge imposed by the power device, and said members are so arranged relative to each other and to the actuator that the movement imparted to them by vertical travel of more than one float in the same direction produces a greater change in the rate of discharge.

8. In a washing jig for separating material into two fractions of different average specific gravities and provided with a power fluid-operated device controlling the rate of discharge of the fraction of higher specific gravity; means for maintaining substantially constant the average specific gravity of the lighter fraction comprising operating means for said discharge-control device including plural relatively movable valve-operating elements, a valve arranged to be moved respectively toward open and closed positions by movement in opposite directions of any of the said elements and to be moved farther in one of said directions by movement of more than one said element in the same direction; the valve being arranged to control delivery of power fluid from a source to the control device, and plural floats respectively connected to the said elements and arranged to effect movement of said elements to increase the rate of discharge upon rising and to decrease it on descending.

9. In a washing jig for separating material into two fractions of different average specific gravities and provided with a power fluid-operated device controlling the rate of discharge of the fraction of higher specific gravity; means for maintaining substantially constant the average specific gravity of the lighter fraction comprising a valve for controlling delivery of power fluid from a source to the discharge-control device, plural operating elements each of which is movable independently in opposite directions respectively to move the valve toward open and closed positions, plural floats free to move independently of each other and respectively connected to the operating elements for moving them in directions to move the valve respectively to increase and decrease the rate of discharge as they rise and descend, the said operating elements being so arranged relative to the valve and to each other as to move it a greater distance upon vertical travel in the same direction by more than one of the floats.

10. A jig according to claim 1 including a relay mechanism arranged to govern operation of the discharge-controlling means and having movable members to which the floats are respectively connected.

11. A jig according to claim 3 wherein the relay is provided with a linearly movable operating element, a lever is pivoted between its ends to said operating element, and wherein each float is connected to one end of the lever and at least one float is connected to each end of the lever, whereby each float serves to move one end of said lever and at the same time to determine the position of the said end as an abutment by which the lever and its pivot may be rocked by movement of the other end to move the pivot and the operating element of the relay.

12. A jig according to claim 3, including a lever pivoted between its ends to the relay for operating it, and wherein each float is connected to one end of said lever and at least one float is connected to each end of the lever for fixing the position of the lever and thereby controlling operation of the relay and discharge-controlling means in accordance with the relative levels of the floats.

13. A jig according to claim 3 including a lever pivoted between its ends to the relay for operating it, a pair of caliper arms engaging each end of the lever, and the pairs of caliper arms connected with the respective floats for rocking as the floats rise or descend.

14. A jig according to claim 8, wherein the relay mechanism is operated by fluid pressure and comprises a control valve to which the floats are connected by means responsive to movement of each float individually.

15. A coal washing jig for separating raw coal into clean and reject fractions and comprising a gate by which the discharge of the reject is controlled, a fluid pressure means for operating said gate, a relay mechanism including a valve controlling the flow of fluid for actuating said gate, a primary float acting on said valve and at least one other float working independently of the first float and set at a higher level operatively connected with and acting on said valve, so as to reduce the variations in the ash content of the clean fraction that would occur if only the primary float were used.

RONALD MERVYN NORTON.
GEORGE BERTRAM NORTON.

REFERENCES CITED

The following references are of record in the file of this patent:

FOREIGN PATENTS

| Number | Country | Date |
|---|---|---|
| 537,338 | Great Britain | June 18, 1941 |
| 630,007 | Germany | May 18, 1936 |